Patented Feb. 3, 1925.

1,525,001

UNITED STATES PATENT OFFICE.

ARTIODE SELLARI, OF BROWNSVILLE, TENNESSEE; CARL TRIPPI, OF WILLISVILLE, ILLINOIS; AND TED MARTIN, OF BROWNSVILLE, TENNESSEE, ASSIGNORS TO SELLARI MANUFACTURING COMPANY, OF BROWNSVILLE, TENNESSEE.

COMPOSITION OF MATTER FOR USE AS A WAX.

No Drawing.     Application filed March 3, 1924.   Serial No. 696,707.

*To all whom it may concern:*

Be it known that we, ARTIODE SELLARI and CARL TRIPPI, citizens of Italy, residing at Brownsville, Haywood County, State of Tennessee, and at Willisville, Perry County, State of Illinois, respectively, and TED MARTIN, a citizen of the United States, residing at Brownsville, in the county of Haywood and State of Tennessee, have invented a new and useful Composition of Matter for Use as a Wax, of which the following is a specification.

This invention relates to a composition of matter for use as wax such as employed by shoemakers and others for the purpose of waxing and waterproofing thread, and is a continuation in part of our copending application filed April 25, 1922, Serial No. 556,411.

One of the objects of the invention is to provide an inexpensive composition the parts of which can be mixed readily and which will produce an efficient wax-like composition which will waterproof the thread and preserve it, thus overcoming one of the objections to ordinary solid wax used by shoemakers and others.

With the foregoing and other objects in view one form of the invention consists of the following ingredients or their equivalents substantially in the proportions stated, to wit: rosin, 6 lbs.; refined cotton seed oil, 14 ounces; spirits of turpentine, 32 ounces.

In mixing the ingredients the rosin is dissolved in the cotton seed oil by heating the mixture. This mixture is then poured into cold water so as to be reduced to a wax-like composition, this action being facilitated by " pulling " the mixture as though " pulling " candy. The wax-like composition and turpentine are then placed together in a suitable vessel heated by water, such for example, as a double boiler. This treatment will reduce the mixture to a liquid ready for use.

Although cotton seed oil is used in the preparation heretofore described, it is to be understood that some other vegetable oils may be used such as palm oil, olive oil, castor oil.

What is claimed is:—

1. A composition of matter for use as a shoemaker's wax or the like, consisting of the following ingredients substantially in proportions stated, to wit, rosin, 6 pounds, a vegetable oil, 14 ounces, spirits of turpentine, 32 ounces.

2. A composition of matter for use as a shoemaker's wax or the like consisting of the following ingredients substantially in the proportions stated, to wit, rosin, 6 pounds, cotton-seed oil (refined) 14 ounces, spirits of turpentine 32 ounces.

In testimony that we claim the foregoing as our own, we have hereto affixed our signatures.

ARTIODE SELLARI.
CARL TRIPPI.
TED MARTIN.